United States Patent
Poon et al.

(10) Patent No.: US 10,088,689 B2
(45) Date of Patent: Oct. 2, 2018

(54) LIGHT ENGINE WITH LENTICULAR MICROLENSLET ARRAYS

(71) Applicant: Microsoft Technology Licensing, LLC, Redmond, WA (US)

(72) Inventors: Yarn Chee Poon, Redmond, WA (US); Steve Robbins, Redmond, WA (US); Angus Wu, Corvallis, OR (US); Jeb Wu, Redmond, WA (US); James Webster, Redmond, WA (US); Richard Andrew Wall, Kirkland, WA (US); Richard James, Woodinville, WA (US); Robin Hsiung, HsinChu (TW); RuPing Huang, HsinChu (TW); Freeway Lin, HsinChu (TW)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/658,017

(22) Filed: Mar. 13, 2015

(65) Prior Publication Data

US 2016/0266398 A1 Sep. 15, 2016

(51) Int. Cl.
G02B 27/28 (2006.01)
G02B 27/22 (2018.01)
(Continued)

(52) U.S. Cl.
CPC ......... *G02B 27/283* (2013.01); *G02B 5/3016* (2013.01); *G02B 5/3083* (2013.01);
(Continued)

(58) Field of Classification Search
CPC .. G02B 5/3083; G02B 27/283; G02B 27/288; G02B 27/28; G02B 27/286;
(Continued)

(56) References Cited

U.S. PATENT DOCUMENTS

| 4,711,512 A | 12/1987 | Upatnieks |
|---|---|---|
| 5,083,854 A | 1/1992 | Zampolin et al. |

(Continued)

FOREIGN PATENT DOCUMENTS

| EP | 1120682 A2 | 8/2001 |
|---|---|---|
| EP | 2945002 A1 | 11/2015 |

(Continued)

OTHER PUBLICATIONS

Ling, L. C., Y. I. Yen, and F. C. Ho. "46.3: An Efficient Illumination System for Single-Pane LCD Projector." SID Symposium Digest SID Symposium Digest of Technical Papers 32.1 (2001): 1184. Web.*

(Continued)

*Primary Examiner* — William R Alexander
*Assistant Examiner* — Henry Duong
(74) *Attorney, Agent, or Firm* — Mark K. Young; Mayer & Williams PC (57) ABSTRACT

An optical light engine includes a pair of lenticular microlenslet arrays (MLAs) located on each side of a polarization converter. Non-polarized light from a source in the engine is focused by the first MLA onto cells of the polarization converter which converts the light to a common state of polarization to increase efficiency and improve contrast in the system. A half wave retarder is included on the polarization converter to change the polarization of any light that is reflected from downstream optical components to match that of the forward propagating light. The second MLA, which includes a relatively large number of microlenslet elements, collects the light from the polarization converter and homogenizes the light to be highly uniform when received at a downstream imaging panel in the light engine such as a liquid crystal on silicon (LCOS) panel.

18 Claims, 7 Drawing Sheets

(51) Int. Cl.
*G02B 27/01* (2006.01)
*G02B 5/30* (2006.01)
*G02B 27/09* (2006.01)

(52) U.S. Cl.
CPC ....... *G02B 27/0172* (2013.01); *G02B 27/225* (2013.01); *G02B 27/286* (2013.01); *G02B 27/0961* (2013.01); *G02B 2027/0178* (2013.01)

(58) Field of Classification Search
CPC .......................... G02B 5/3016; G02B 27/225; G02B 27/0172; G02B 2027/0178; G02B 27/0961
USPC ............................. 359/619, 621, 622, 489.07
See application file for complete search history.

(56) References Cited

U.S. PATENT DOCUMENTS

| | | | |
|---|---|---|---|
| 5,856,842 A | 1/1999 | Tedesco | |
| 6,104,536 A | 8/2000 | Eckhardt | |
| 6,323,970 B1 | 11/2001 | Popovich | |
| 6,580,529 B1 | 6/2003 | Amitai et al. | |
| 6,621,533 B2 * | 9/2003 | Slack | G02B 5/3083 348/E9.027 |
| 7,184,615 B2 | 2/2007 | Levola | |
| 7,576,916 B2 | 8/2009 | Amitai | |
| 7,626,644 B2 | 12/2009 | Shestak et al. | |
| 8,160,411 B2 | 4/2012 | Levola et al. | |
| 8,233,204 B1 | 7/2012 | Robbins et al. | |
| 8,611,014 B2 | 12/2013 | Valera et al. | |
| 8,817,350 B1 | 8/2014 | Robbins et al. | |
| 8,837,050 B2 | 9/2014 | Hudman | |
| 9,316,832 B2 * | 4/2016 | Levin | G02B 27/0172 |
| 9,348,143 B2 * | 5/2016 | Gao | G02B 27/0172 |
| 2001/0005284 A1 | 6/2001 | Lee et al. | |
| 2001/0033418 A1 | 10/2001 | Hayashi | |
| 2002/0018150 A1 | 2/2002 | Ogawa et al. | |
| 2002/0131020 A1 | 9/2002 | Huang | |
| 2005/0248849 A1 | 11/2005 | Urey et al. | |
| 2007/0041684 A1 | 2/2007 | Popovich et al. | |
| 2007/0159525 A1 * | 7/2007 | Tomisawa | G02B 27/2214 348/51 |
| 2007/0195273 A1 | 8/2007 | Nishida et al. | |
| 2009/0160757 A1 | 6/2009 | Robinson | |
| 2013/0050610 A1 | 2/2013 | Parry-Jones et al. | |
| 2014/0010265 A1 | 1/2014 | Peng | |
| 2014/0104665 A1 | 4/2014 | Popovich et al. | |
| 2014/0118826 A1 * | 5/2014 | Jiao | G02B 5/30 359/491.01 |
| 2014/0140653 A1 | 5/2014 | Brown et al. | |
| 2014/0140654 A1 | 5/2014 | Brown et al. | |
| 2014/0184699 A1 | 7/2014 | Ito et al. | |
| 2014/0204455 A1 | 7/2014 | Popovich et al. | |
| 2014/0240613 A1 * | 8/2014 | Bohn | G02B 27/0172 349/11 |
| 2014/0285878 A1 * | 9/2014 | Escuti | G02F 1/13363 359/352 |
| 2016/0147070 A1 * | 5/2016 | Border | G02B 27/0176 359/633 |

FOREIGN PATENT DOCUMENTS

| | | | | |
|---|---|---|---|---|
| GB | 2410339 A * | 7/2005 | .......... | G02B 3/0062 |
| WO | 2012/172295 A1 | 12/2012 | | |
| WO | 2014109115 A1 | 7/2014 | | |

OTHER PUBLICATIONS

Urey, et al., "Microlens Array-Based Exit Pupil Expander for Full Color Display Applications", In Proceedings of SPIE, vol. 5456, Apr. 2004, 10 pages.

S. Massenot, et al., "Multiplexed holographic transmission gratings recorded in holographic polymer-dispersed liquid crystals: static and dynamic studies," Appl. Opt. 44, 5273-5280 (2005) (8 pages total).

Zharkova G.M.t al, "Study of the dynamics of transmission gratings growth on holographic polymer-dispersed liquid crystals." International Conference on Methods of Aerophysical Research, ICMAR 2008 (4 pages total).

Yan A., "Multiplexing holograms in the photopolymer with equal diffraction efficiency," Advances in Optical Data Storage Technology, Proceedings of SPIE, vol. 5643, (SPIE, Bellingham, WA), 2005. (9 pages total).

Pu A. et al. "Exposure schedule for multiplexing holograms in photopolymer films," Opt. Eng. 35(10), Oct. 1996 (6 pages total).

Han X., et al. "Accurate diffraction efficiency control for multiplexed volume holographic gratings," Opt Eng. 41, 2002 (4 pages total).

Minier V. et al, "Diffraction Characteristics of Superimposed Holographic gratings in Planar Optical waveguides," IEEE Photonics Technology Letters, vol. 4, No. 10, Oct. 1992. (4 pages total).

Kress, et al., "Exit pupil expander for wearable see-through displays", Proc. SPIE 8368, Photonic Applications for Aerospace, Transportation, and Harsh Environment III, 83680D (May 1, 2012) (8 pages total).

"International Search Report and Written Opinion Issued in PCT Application No. PCT/US2016/018566", dated May 17, 2016, (15 Pages total).

"SecondWritten Opinion Issued in PCT Application No. PCT/US2016/018566", dated Jan. 24, 2017, 9 Pages.

"International Preliminary Report on Patentability Issued in PCT Application No. PCT/US2016/018566", dated May 29, 2017, 12 Pages.

* cited by examiner

LIGHT ENGINE WITH LENTICULAR MICROLENSLET ARRAYS

BACKGROUND

Light engines may be used in a variety of imaging applications including near-to-eye displays used, for example, in head mounted display (HMD) devices.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

An optical light engine includes a pair of lenticular microlenslet arrays (MLAs) located on each side of a polarization converter. Non-polarized light from a source in the engine is focused by the first MLA onto cells of the polarization converter which converts the light to a common state of polarization to increase efficiency and improve contrast in the system. A half wave retarder is included on the polarization converter to change the polarization of any light that is reflected from downstream optical components to match that of the forward propagating light. The second MLA, which includes a relatively large number of microlenslet elements, collects the light from the polarization converter and homogenizes the light to be highly uniform when received at a downstream imaging panel in the light engine such as a liquid crystal on silicon (LCOS) panel. In an alternative implementation, the polarization converter is deleted from the light path and instead a polarization diffractive grating is incorporated into the first MLA to generate the polarized light in the system.

The optical light engine provides improved spatial uniformity of the exit pupil and reduces losses compared to conventional arrangement by using fewer optical elements to reduce overall system weight and parts count. Power efficiency may be improved while also reducing thermal loading on the system.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

Like reference numerals indicate like elements in the drawings. Elements are not drawn to scale unless otherwise indicated.

DETAILED DESCRIPTION

Exit light pupil uniformity in light engines can be particularly important in certain applications. For example, in near-to-eye display applications used in head-mounted display (HMD) and other devices, if exit pupil non-uniformity is large, there can be increased spatial non-uniformity at larger field of view (FOV) angles across the display. Such non-uniformity can cause a user to perceive differences in brightness across the display that change with eye movement. This can cause user discomfort and significantly reduce overall display quality and the sense of immersiveness in the virtual reality and mixed reality environments in which such devices are commonly utilized.

The present light engine uses multiple lenticular microlenslet (also commonly referred to as a microlens) arrays (MLAs) in the light path of the light engine. MLAs use an array of substantially cylindrical lenses that have apertures that are typically on the order of micrometers. Utilization of the MLAs can typically improve operating efficiency of the light engine by reducing optical losses compared with non-lenticular solutions while increasing homogeneity of light received in the light engine's imaging panel to substantially improve exit pupil uniformity. The improved operating efficiency can result in an overall device configuration that uses less power with reduced weight which can be important criteria to optimize, particularly in HMD applications. The improved exit pupil uniformity can reduce variations in light along waveguides that may be coupled to the exit pupil in some implementations. Improved exit pupil uniformity can also be expected to increase user efficiency when interacting with the device and enhance the overall quality of the user experience in many cases such as increasing immersiveness in HMD applications.

Figure 1:
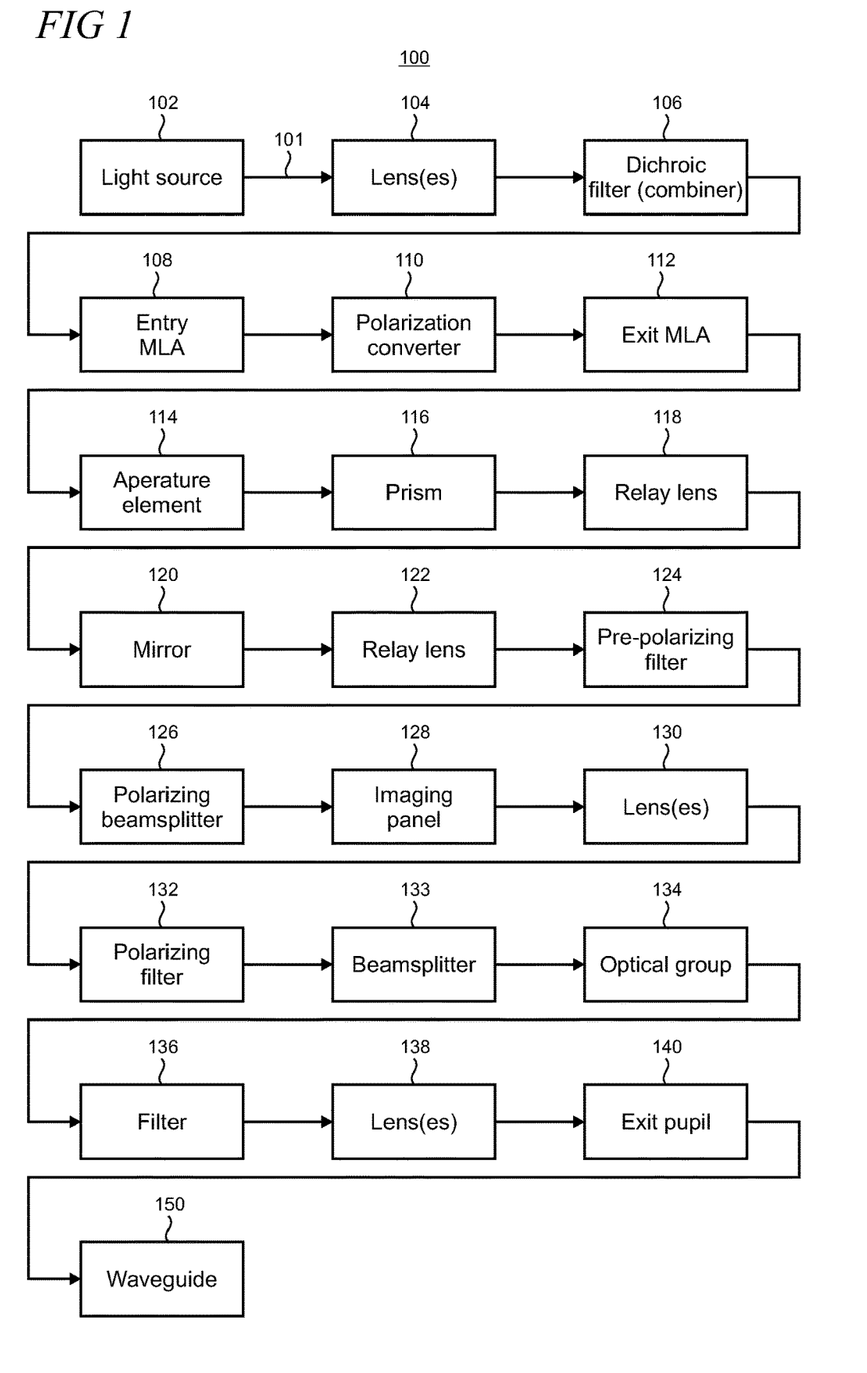
FIG. 1 shows a simplified functional block diagram of the light path through optical components in a light engine.
Figure 2:
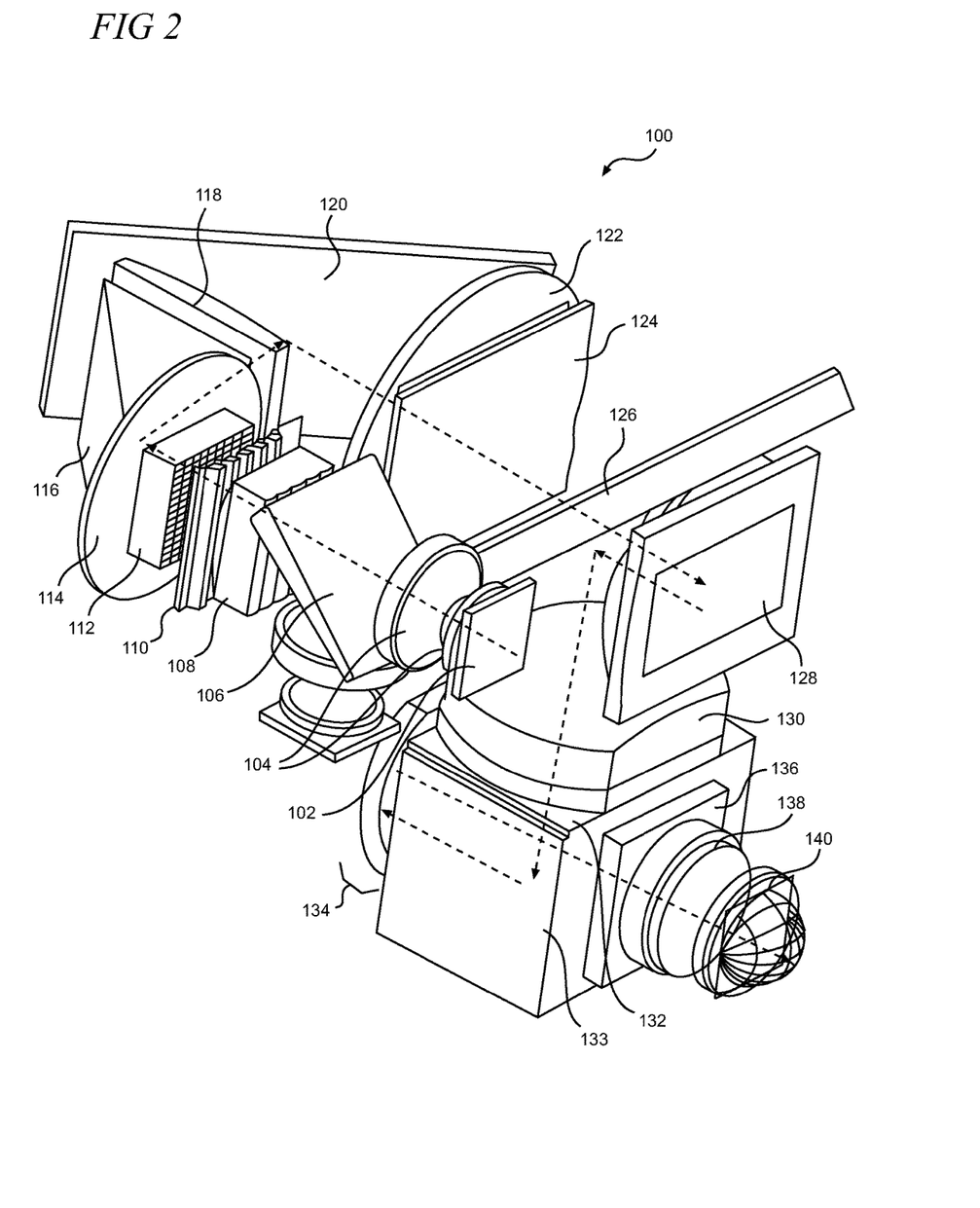
FIG. 2 shows a pictorial illustration of light engine components.
Figure 3:
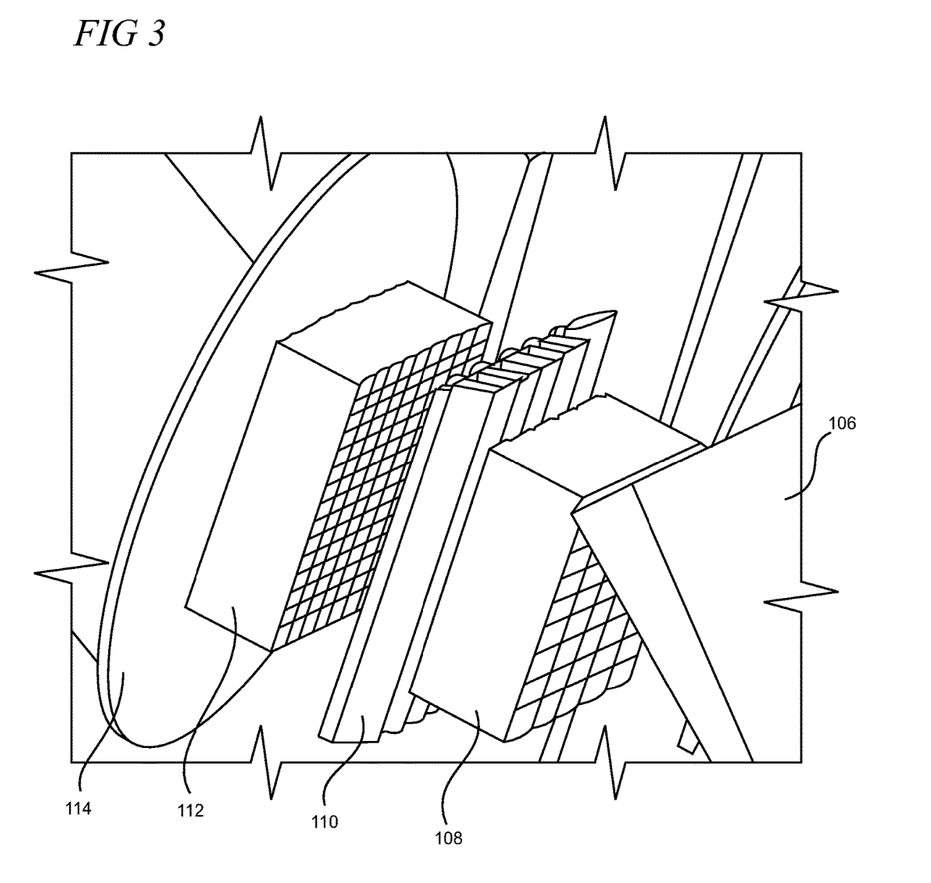
FIG. 3 shows an enlarged pictorial view of light engine components.

Turning now to the drawings, FIG. 1 shows a simplified functional block diagram of the light path (representatively indicated by reference numeral 101) through various optical components in a light engine system 100. FIG. 2 shows the optical components in a pictorial view and FIG. 3 shows an enlarged pictorial view of the MLAs and polarization converter.

It is emphasized that the components shown are illustrative and various modifications can be made to the components and/or their arrangement in the light path to suit a particular implementation. One or more light sources 102 generate unpolarized (i.e., randomly polarized) light into the system 100 that generally has non-uniform angular and spatial distributions that results in low luminance homogeneity over the expanse of the exit pupil. The light sources may typically comprise one or more LEDs (light emitting diode), OLED (organic light emitting diode), quantum dot, partially coherent light source, laser, or the like. One or more lenses 104, such as collimating lenses are typically used to and align and narrow the light emitted from the light source 102 in a collimated manner.

A filter 106, such as dichroic filter or other suitable component, functions as a beam combiner so that the primary additive colors (red, green, and blue, collectively "RGB") are included in the light path 101. An entry MLA 108 is positioned at the light path's entry to a polarization converter 110 and an exit MLA 112 is positioned at the light's exit from the polarization converter. The polarization converter is typically fabricated using liquid crystal, diffractive gratings, or other suitable technologies to change the state of polarization of the incoming light with a certain degree of spatial uniformity within a range of wavelengths. An anisotropic birefringent film acting as a half wave retarder may be laminated to a backside surface of the polarization converter to change the polarization of any light that is reflected from downstream optical components in the light engine to match that of the forward propagating light.

Each MLA incorporates a substantially rectangular grid of refractive optical elements that are located on a supporting substrate. The refractive optical elements can vary in size and number by implementation. The aperture shape (e.g., whether circular or non-circular) can also vary. The MLAs are typically fabricated using lightweight optical-grade polymers that may be molded and/or machined (e.g., in primary and/or secondary processes), but glass materials may also be utilized in some implementations.

Each MLA is configured to focus and concentrate incoming light onto respective optical components that are located downstream in the light path 101. The microlenslets in the array produce a corresponding array of points of focused light in which the output array can be controlled according to microlenslet shape, optical properties, and orientation within the light engine. Thus, an MLA can be tilted in some cases to control the directionality of the output array of focused light.

Figure 4:
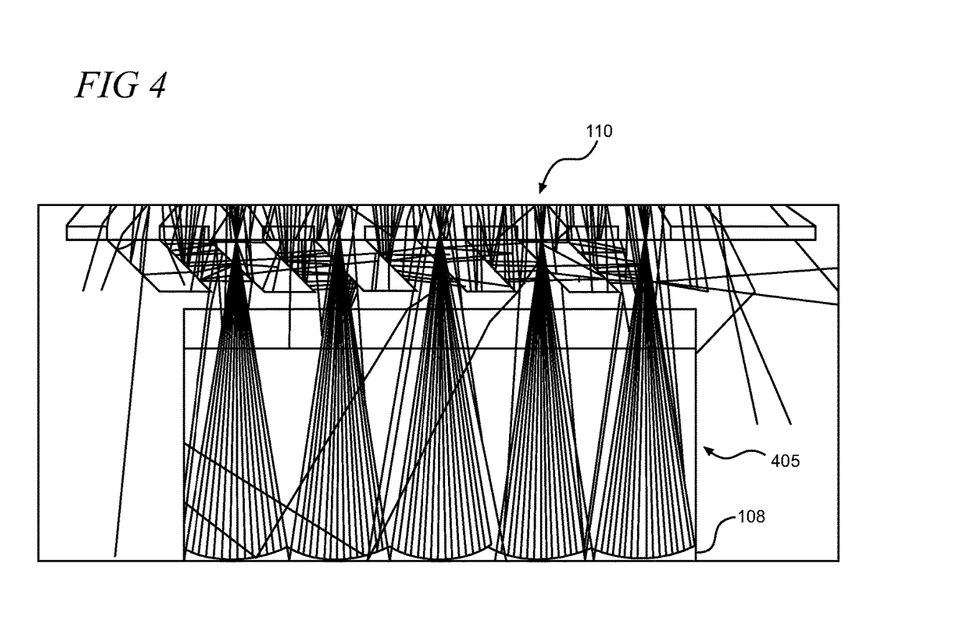
FIG. 4 shows light paths that are focused on a polarization converter from a lenticular MLA.
Figure 5:
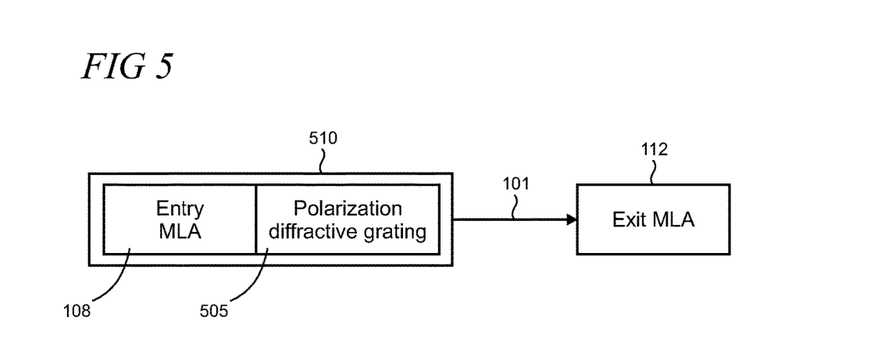
FIG. 5 shows an entry MLA that includes a polarization diffractive grating.

In this particular illustrative example, the entry MLA 106 focuses and concentrates light onto photo-sensitive cells of the polarization converter 110. Accordingly, the configuration of the entry MLA 108 is adapted with a microlenslet distribution, focal length, and other properties that are matched to the polarization converter configuration. FIG. 4 shows light paths 405 propagating from the entry MLA 108 to the polarization converter 110 which illustrate the focusing effect of the array of microlenslets (only a portion of the array is shown in FIG. 4). This implementation helps to increase the efficiency of the system through lower losses in the lenticular array since there are fewer microlens elements. Manufacturing errors may be also be reduced while enhancing ease of fabrication. Hence, more light is transferred and focused to the polarization convertor 110.

The configuration of the exit MLA is matched to the size and resolution of downstream imaging panel 128. Accordingly, the exit MLA 112 typically includes a greater number of microlenslets that are more finely distributed in a larger array compared to the entry MLA 108.

In an alternative implementation, either or both MLAs 108 and 112 can be configured to have a substantially flat surface that can be attached, for example using adhesives and/or mechanical fasteners, to a surface of the polarization converter 110. Such attachment may reduce the need for anti-reflective coatings that may otherwise be utilized in the gap between the components.

The light engine components downstream from the exit MLA may be arranged conventionally in many cases. An aperture element 114 is configured to admit light to a prism 116 that couples light into a relay lens 118 that magnifies the output array from the exit MLA 112. A mirror 120 reflects a light into another relay lens 122 that provides additional magnification where the overall magnification by the pair of relay lenses is selected to match the size of the imaging panel 128.

A pre-polarizing filter 124 and polarizing beamsplitter 126 are respectively disposed next along the light path, followed by the imaging panel 128. The light from the imaging panel is coupled to the exit pupil 140 using a series of optical elements including one or more lenses 130, polarizing filter 132, beamsplitter 133, optical group 134 (which may include an additional birefringent retarder, lenses, and mirror), filter 136, and lenses 138. The exit pupil may be coupled to a waveguide 150 in some applications to direct the output of the light engine to other components and/or systems that may be utilized in a given application/device (the waveguide is not shown in FIG. 2 for the sake of clarity in exposition).

Figure 6:
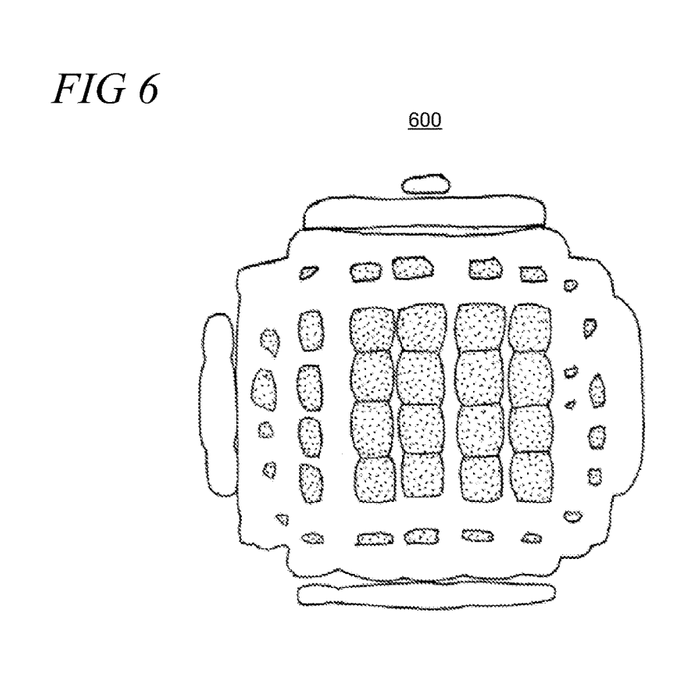
FIG. 6 shows a light pattern of a conventional light engine at an exit pupil.
Figure 7:
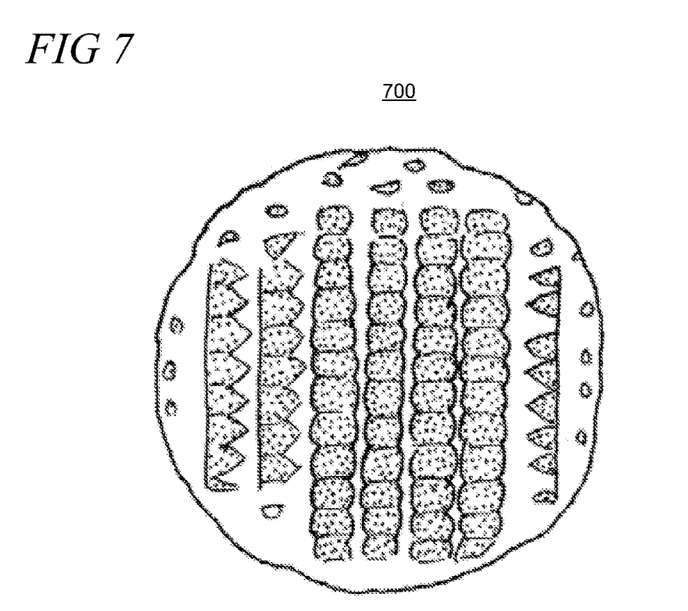
FIG. 7 shows an improved light pattern of a light engine at an exit pupil using the present lenticular MLAs.

FIGS. 6 and 7 show a comparison between uniformity of light engine output at the exit pupil using conventional components and the present lenticular MLAs. The simplified drawings represent images that may be captured at the exit pupil using instrumentation such as a camera. FIG. 6 shows an illustrative image 600 of a conventional light engine output at the exit pupil. FIG. 7 shows an illustrative image 700 of the light output at the exit pupil from the present light engine with lenticular MLAs. As shown, the image 700 includes a light pattern that is more homogenized with significantly better uniformity across the exit pupil compared to image 600.

Figure 8:
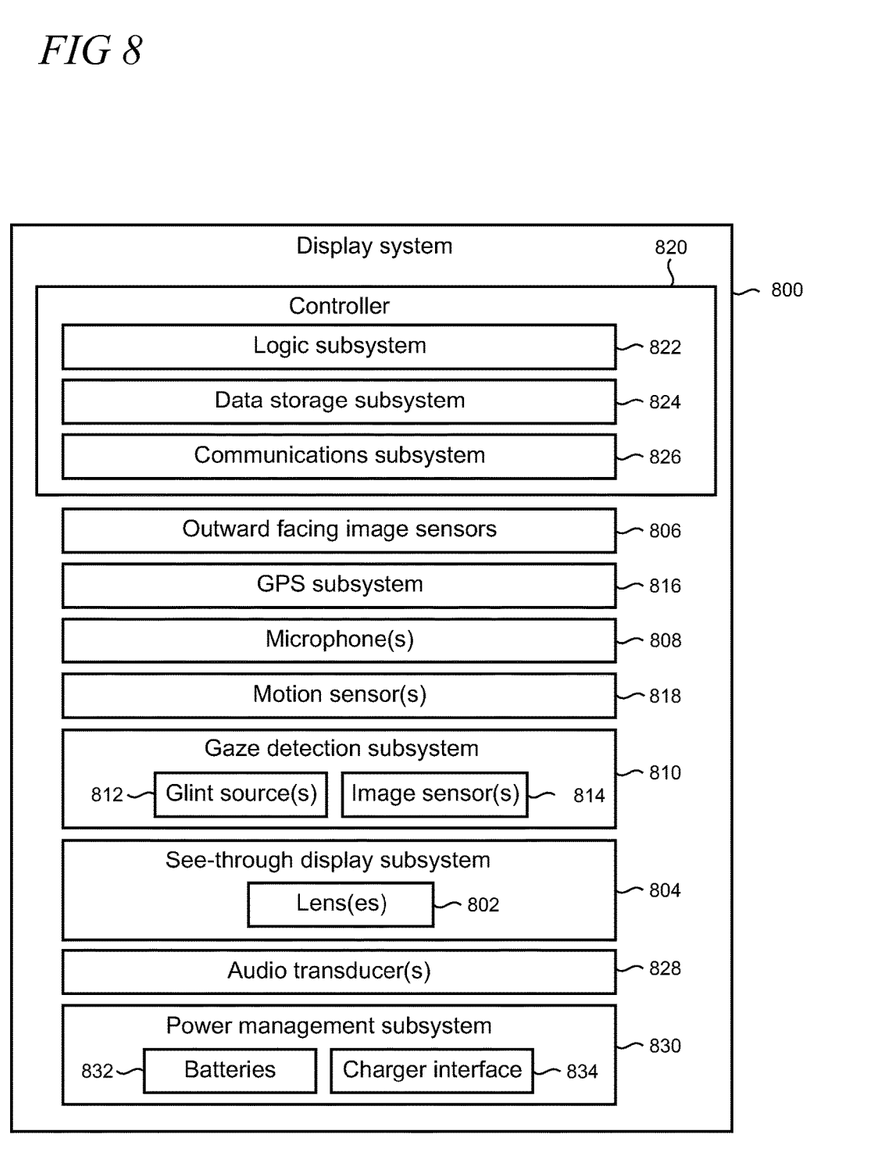
FIG. 8 is a block diagram of an illustrative see-through, mixed reality display device.

FIG. 8 is a block diagram of an illustrative see-through, mixed reality or virtual reality display system with which the present light engine may be used in some applications. The display system may take any suitable form, including but not limited to near-to-eye devices such as those used with an HMD device and/or other portable/mobile devices. Display system 800 comprises one or more lenses 802 that form a part of a display subsystem 804, such that images may be displayed using lenses 802 (e.g. using projection onto lenses 802, one or more waveguide systems incorporated into the lenses 802, and/or in any other suitable manner). Display system 800 further comprises one or more outward-facing image sensors 806 configured to acquire images of a background scene and/or physical space being viewed by a user, and may include one or more microphones 808 configured to detect sounds, such as voice commands from a user. Outward-facing image sensors 806 may include one or more depth sensors and/or one or more two-dimensional image sensors. In alternative arrangements, a mixed reality display system, instead of incorporating a see-through display subsystem, may display mixed reality images through a viewfinder mode for an outward-facing image sensor.

The display system 800 may further include a gaze detection subsystem 810 configured for detecting a direction of gaze of each eye of a user or a direction or location of focus, as described above. Gaze detection subsystem 810 may be configured to determine gaze directions of each of a user's eyes in any suitable manner. For example, in the illustrative example shown, a gaze detection subsystem 810 includes one or more glint sources 812, such as infrared light sources, that are configured to cause a glint of light to reflect from each eyeball of a user, and one or more image sensors 814, such as inward-facing sensors, that are configured to capture an image of each eyeball of the user. Changes in the glints from the user's eyeballs and/or a location of a user's pupil, as determined from image data gathered using the image sensor(s) 814, may be used to determine a direction of gaze.

In addition, a location at which gaze lines projected from the user's eyes intersect the external display may be used to determine an object at which the user is gazing (e.g. a displayed virtual object and/or real background object). Gaze detection subsystem 810 may have any suitable number and arrangement of light sources and image sensors. In some implementations, the gaze detection subsystem 810 may be omitted.

The display system 800 may also include additional sensors. For example, display system 800 may comprise a global positioning system (GPS) subsystem 816 to allow a location of the display system 800 to be determined. This may help to identify real world objects, such as buildings, etc. that may be located in the user's adjoining physical environment.

The display system 800 may further include one or more motion sensors 818 (e.g., inertial, multi-axis gyroscopic or acceleration sensors) to detect movement and position/orientation/pose of a user's head when the user is wearing the system as part of an augmented reality HMD device. Motion data may be used, potentially along with eye-tracking glint data and outward-facing image data, for gaze detection, as well as for image stabilization to help correct for blur in images from the outward-facing image sensor(s) 806. The use of motion data may allow changes in gaze location to be tracked even if image data from outward-facing image sensor(s) 806 cannot be resolved.

In addition, motion sensors 818, as well as microphone(s) 808 and gaze detection subsystem 810, also may be employed as user input devices, such that a user may interact with the display system 800 via gestures of the eye, neck and/or head, as well as via verbal commands in some cases. It may be understood that sensors are included for the purpose of example and are not intended to be limiting in any manner, as any other suitable sensors and/or combination of sensors may be utilized to meet the needs of a particular implementation of an augmented reality HMD device. For example, biometric sensors (e.g., for detecting heart and respiration rates, blood pressure, brain activity, body temperature, etc.) or environmental sensors (e.g., for detecting temperature, humidity, elevation, UV (ultraviolet) light levels, etc.) may be utilized in some implementations.

The display system 800 can further include a controller 820 having a logic subsystem 822 and a data storage subsystem 824 in communication with the sensors, gaze detection subsystem 810, display subsystem 804, and/or other components through a communications subsystem 826. The communications subsystem 826 can also facilitate the display system being operated in conjunction with remotely located resources, such as processing, storage, power, data, and services. That is, in some implementations, an HMD device can be operated as part of a system that can distribute resources and capabilities among different components and subsystems.

The storage subsystem 824 may include instructions stored thereon that are executable by logic subsystem 822, for example, to receive and interpret inputs from the sensors, to identify location and movements of a user, to identify real objects using surface reconstruction and other techniques, and dim/fade the display based on distance to objects so as to enable the objects to be seen by the user, among other tasks.

The display system 800 is configured with one or more audio transducers 828 (e.g., speakers, earphones, etc.) so that audio can be utilized as part of an augmented reality experience. A power management subsystem 830 may include one or more batteries 832 and/or protection circuit modules (PCMs) and an associated charger interface 834 and/or remote power interface for supplying power to components in the display system 800.

Figure 9:
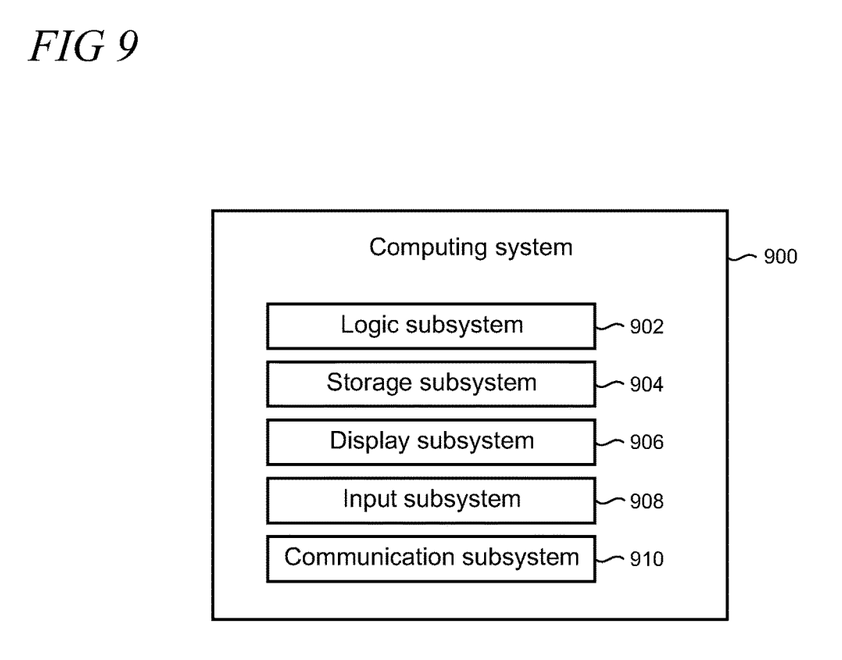
FIG. 9 shows an exemplary computing system.

FIG. 9 schematically shows a non-limiting embodiment of a computing system 900 that can be used when implementing one or more of the configurations, arrangements, methods, or processes described above. An HMD device may be one non-limiting example of computing system 900. The computing system 900 is shown in simplified form. It may be understood that virtually any computer architecture may be used without departing from the scope of the present arrangement. In different embodiments, computing system 900 may take the form of a display device, wearable computing device, mainframe computer, server computer, desktop computer, laptop computer, tablet computer, home-entertainment computer, network computing device, gaming device, mobile computing device, mobile communication device (e.g., smart phone), etc.

The computing system 900 includes a logic subsystem 902 and a storage subsystem 904. The computing system 900 may optionally include a display subsystem 906, an input subsystem 908, a communication subsystem 910, and/or other components not shown in FIG. 9.

The logic subsystem 902 includes one or more physical devices configured to execute instructions. For example, the logic subsystem 902 may be configured to execute instructions that are part of one or more applications, services, programs, routines, libraries, objects, components, data structures, or other logical constructs. Such instructions may be implemented to perform a task, implement a data type, transform the state of one or more components, or otherwise arrive at a desired result.

The logic subsystem 902 may include one or more processors configured to execute software instructions. Additionally or alternatively, the logic subsystem 902 may include one or more hardware or firmware logic machines configured to execute hardware or firmware instructions. The processors of the logic subsystem 902 may be single-core or multi-core, and the programs executed thereon may be configured for sequential, parallel, or distributed processing. The logic subsystem 902 may optionally include individual components that are distributed among two or more devices, which can be remotely located and/or configured for coordinated processing. Aspects of the logic subsystem 902 may be virtualized and executed by remotely accessible, networked computing devices configured in a cloud-computing configuration.

The storage subsystem 904 includes one or more physical devices configured to hold data and/or instructions executable by the logic subsystem 902 to implement the methods and processes described herein. When such methods and processes are implemented, the state of the storage subsystem 904 may be transformed—for example, to hold different data.

The storage subsystem 904 may include removable media and/or built-in devices. The storage subsystem 904 may include optical memory devices (e.g., CD (compact disc), DVD (digital versatile disc), HD-DVD (high definition DVD), Blu-ray disc, etc.), semiconductor memory devices (e.g., RAM (random access memory), ROM (read only memory), EPROM (erasable programmable ROM), EEPROM (electrically erasable ROM), etc.) and/or magnetic memory devices (e.g., hard-disk drive, floppy-disk drive, tape drive, MRAM (magneto-resistive RAM), etc.), among others. The storage subsystem 904 may include volatile, nonvolatile, dynamic, static, read/write, read-only, random-access, sequential-access, location-addressable, file-addressable, and/or content-addressable devices.

It may be appreciated that the storage subsystem 904 includes one or more physical devices, and excludes propagating signals per se. However, in some implementations, aspects of the instructions described herein may be propagated by a pure signal (e.g., an electromagnetic signal, an optical signal, etc.) using a communications medium, as opposed to being stored on a storage device. Furthermore, data and/or other forms of information pertaining to the present arrangement may be propagated by a pure signal.

In some embodiments, aspects of the logic subsystem 902 and of the storage subsystem 904 may be integrated together into one or more hardware-logic components through which the functionality described herein may be enacted. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

When included, the display subsystem 906 may be used to present a visual representation of data held by storage subsystem 904. This visual representation may take the form of a graphical user interface (GUI). As the present described methods and processes change the data held by the storage subsystem, and thus transform the state of the storage subsystem, the state of the display subsystem 906 may likewise be transformed to visually represent changes in the underlying data. The display subsystem 906 may include one or more display devices utilizing virtually any type of technology. Such display devices may be combined with logic subsystem 902 and/or storage subsystem 904 in a shared enclosure in some cases, or such display devices may be peripheral display devices in others.

When included, the input subsystem 908 may include or interface with one or more user-input devices such as a keyboard, mouse, touch screen, or game controller. In some embodiments, the input subsystem may include or interface with selected natural user input (NUI) components. Such components may be integrated or peripheral, and the transduction and/or processing of input actions may be handled on- or off-board. Exemplary NUI components may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing components for assessing brain activity.

When included, the communication subsystem 910 may be configured to communicatively couple the computing system 900 with one or more other computing devices. The communication subsystem 910 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 900 to send and/or receive messages to and/or from other devices using a network such as the Internet.

Various exemplary embodiments of the present light engine with lenticular microlenslet arrays are now presented by way of illustration and not as an exhaustive list of all embodiments. An example includes a light engine, comprising: at least one light source configured to emit light in an unpolarized state with a non-uniform spatial distribution; an entry lenticular microlenslet array (MLA) that is disposed along a light path in the light engine and coupled to receive light from the light source; a polarization converter having an array of polarization converting cells, the polarization converter disposed along the light path to receive light from the entry lenticular MLA that is focused on the cells, the polarization converter configured to convert unpolarized light from the source into light having a common state of polarization at an output of the polarization converter; and an exit MLA disposed along the light path to receive polarized light from the output of the polarization converter, the exit MLA comprising a microlenslets array configured to focus light on a downstream imaging panel with improved uniformity of spatial distribution relative to the light from the source.

In another example, the light engine further comprises a half wave retarder disposed along the light path at the output of the polarization converter, the half wave retarder being configured to change a polarization state of light reflected from downstream optical components to match that of forward propagating light along the light path. In another example, the half wave retarder includes a birefringent film disposed on the polarization converter as a lamination. In another example, the light engine further includes a liquid crystal on silicon (LCOS) imaging panel. In another example, the light engine further includes one or more relay lenses disposed along the light path between an output of the exit MLA and the imaging panel, the relay lenses applying a magnification factor between an input and an output of the relay lenses. In another example, the light engine further includes an exit pupil at a distal end of the light path, the exit pupil being coupled to receive light from the imaging panel. In another example, the light engine further includes a waveguide coupled to the exit pupil. In another example, the light engine further comprises a collimating lens disposed along the light path at an output of the source, the collimating lens being configured to narrow emitted light from the source. In another example, the light engine further comprises a beam combiner disposed along the light path at an output of the collimating lens, the beam combiner outputting light that includes primary color constituents.

A further example includes an optical subassembly of components configured for use in a light engine, comprising: a first lenticular microlenslet array (MLA) that is positioned along a light path in the light engine to receive unpolarized light from one or more light sources; a polarization converter positioned along the light path downstream from the first lenticular MLA and configured to convert the unpolarized light from the one or more light sources into polarized light; a half wave retarder positioned along the light path downstream from the polarization converter and configured to change a polarization state of backward propagating light in the light engine to match a polarization state of forward propagating light in the light engine; and a second lenticular MLA that is positioned along the light path downstream from the polarization converter and coupled to receive polarized light and comprising a plurality of microlenslets in an array that is sized and shaped to expose an imaging panel with focused polarized light, a distribution of the focused polarized light having increased spatial uniformity relative to the light from the one or more light sources.

In another example, the first lenticular MLA or the second lenticular MLA is fabricated from molded plastic. In another example, the first lenticular MLA or the second lenticular MLA is fabricated from glass. In another example, in the optical subassembly, angular uniformity of light from the second lenticular MLA is improved relative to the light from the one or more light sources. In another example, in the optical subassembly, intensity uniformity of the light from the second lenticular MLA is improved relative to the light from the one or more light sources. In another example, in the optical subassembly, homogeneity of light from the second lenticular MLA is improved relative to the light from the one or more sources.

A further example includes a display system, comprising: a near-to-eye display configured to display images; one or more waveguides to couple images into the display; and a light engine configured to generate light used by an imaging panel, the imaging panel configured to generate the images, the light engine comprising: one or more sources configured to emit the light, a first lenticular microlenslet array (MLA) configured to receive the light as an input and propagate focused light as a first output, a second lenticular microlenslet array (MLA) configured to receive light from the first output and propagate focused light as a second output, an imaging panel on which the focused light from the second output impinges, and an exit pupil configured to couple light from the imaging panel into the one or more waveguides, the coupled light having increased homogeneity relative to the light emitted from the one or more sources.

In another example, the display system further includes a polarization converter disposed in the light path between the first and second lenticular MLAs, the polarization converter configured to convert unpolarized light from the one or more light sources into polarized light. In another example, the first lenticular MLA is fixed to the polarization converter using adhesive or fasteners. In another example, the display system further includes a half wave retarder located along a light path between the polarization converter and the second lenticular MLA. In another example, the half wave retarder is a film that is laminated to the polarization converter.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed:

1. A light engine, comprising:
   at least one light source configured to emit light in an unpolarized state with a non-uniform spatial distribution;
   an entry lenticular microlenslet array (MLA) that is disposed along a light path in the light engine and coupled to receive light from the light source, wherein the entry MLA is tilted to control a direction in which the light is output downstream to a polarization converter;
   the polarization converter having an array of polarization converting cells, the polarization converter disposed along the light path to receive light from the entry lenticular MLA that is focused on the polarization converter, the polarization converter configured to convert unpolarized light from the light source into light having a common state of polarization at an output of the polarization converter; and
   an exit MLA disposed along the light path to receive polarized light from the output of the polarization converter, the exit MLA comprising a microlenslet array configured to focus light on a downstream imaging panel with improved uniformity of spatial distribution relative to the light from the light source.

2. The light engine of claim 1 further comprising a half wave retarder disposed along the light path at the output of the polarization converter, the half wave retarder being configured to change a polarization state of light reflected from downstream optical components to match that of forward propagating light along the light path.

3. The light engine of claim 2 in which the half wave retarder includes a birefringent film disposed on the polarization converter as a lamination.

4. The light engine of claim 1 further including a liquid crystal on silicon (LCOS) imaging panel.

5. The light engine of claim 1 further including one or more relay lenses disposed along the light path between an output of the exit MLA and the imaging panel, the relay lenses applying a magnification factor between an input and an output of the relay lenses.

6. The light engine of claim 1 further including an exit pupil at a distal end of the light path, the exit pupil being coupled to receive light from the imaging panel.

7. The light engine of claim 6 further including a waveguide coupled to the exit pupil.

8. The light engine of claim 1 further comprising a collimating lens disposed along the light path at an output of the source, the collimating lens being configured to narrow emitted light from the source.

9. The light engine of claim 8 further comprising a beam combiner disposed along the light path at an output of the collimating lens, the beam combiner outputting light that includes primary color constituents.

10. An optical subassembly of components configured for use in a light engine, comprising:
    a first lenticular microlenslet array (MLA) that is positioned along a light path in the light engine to receive unpolarized light from one or more light sources, wherein the first MLA is tilted to control a direction in which light is output downstream to a polarization converter;
    a polarization converter positioned along the light path downstream from the first lenticular MLA and configured to convert the unpolarized light from the one or more light sources into polarized light;
    a half wave retarder positioned along the light path downstream from the polarization converter and configured to change a polarization state of backward propagating light in the light engine to match a polarization state of forward propagating light in the light engine; and
    a second lenticular MLA that is positioned along the light path downstream from the polarization converter and coupled to receive polarized light and comprising a plurality of microlenslets in an array that is sized and shaped to expose an imaging panel with focused polarized light, a distribution of the focused polarized light having increased spatial uniformity relative to the light from the one or more light sources,
    wherein the first lenticular MLA and the second lenticular MLA are each configured to have a substantially flat surface oriented in a direction of the polarization converter and are attached directly to a surface of the polarization converter by one or more of adhesives and mechanical fasteners without any intervening space.

11. The optical subassembly of claim 10 in which the first lenticular MLA or the second lenticular MLA is fabricated from molded plastic.

12. The optical subassembly of claim 10 in which the first lenticular MLA or the second lenticular MLA is fabricated from glass.

13. The optical subassembly of claim 10 in which angular uniformity of light from the second lenticular MLA is improved relative to the light from the one or more light sources.

14. The optical subassembly of claim 10 in which luminance uniformity of the light from the second lenticular MLA is improved relative to the light from the one or more light sources.

15. The optical subassembly of claim 10 in which homogeneity of light from the second lenticular MLA is improved relative to the light from the one or more sources.

16. A display system, comprising:
   a near-to-eye display configured to display images;
   one or more waveguides to couple images into the display; and
   a light engine configured to generate light used by an imaging panel, the imaging panel configured to generate the images, the light engine comprising:
      one or more light sources configured to emit the light,
      a first lenticular microlenslet array (MLA) configured to receive the light as an input and propagate focused light as a first output,
      a second lenticular microlenslet array (MLA) configured to receive light from the first output and propagate focused light as a second output, wherein the second MLA is tilted to control a direction in which light is output downstream in the light path toward the one or more waveguides,
      a polarization converter disposed in the light path between the first and second lenticular MLAs, the polarization converter configured to convert unpolarized light from the one or more light sources into polarized light, wherein the first lenticular MLA and the second lenticular MLA are each configured to have a substantially flat surface oriented in a direction of the polarization converter and are attached directly to a surface of the polarization converter by one or more of adhesives and mechanical fasteners without any intervening space,
      an imaging panel on which the focused light from the second output impinges, and
      an exit pupil configured to couple light from the imaging panel into the one or more waveguides, the coupled light having increased homogeneity relative to the light emitted from the one or more light sources.

17. The display system of claim 16 further including a half wave retarder located along a light path between the polarization converter and the second lenticular MLA.

18. The display system of claim 17 in which the half wave retarder is a film that is laminated to the polarization converter.

* * * * *